(12) United States Patent
Rajkumar

(10) Patent No.: US 8,042,034 B1
(45) Date of Patent: Oct. 18, 2011

(54) DATABASE WITH LINKED AUDIO FILE

(75) Inventor: Ajay Rajkumar, New Providence, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 09/315,621

(22) Filed: May 20, 1999

(51) Int. Cl.
G06F 17/20 (2006.01)

(52) U.S. Cl. ........................ 715/200; 715/727

(58) Field of Classification Search .............. 715/1, 3, 715/104.1, 727; 379/68, 88.22, 88.01; 707/1, 707/3, 104.1, 500.1
See application file for complete search history.

(56) References Cited

U.S. PATENT DOCUMENTS

| | | | | |
|---|---|---|---|---|
| 4,916,726 A * | 4/1990 | Morley et al. | ............ | 379/88.13 |
| 5,241,671 A * | 8/1993 | Reed et al. | .................. | 345/473 |
| 5,491,481 A * | 2/1996 | Akagiri | ...................... | 341/87 |
| 5,584,006 A * | 12/1996 | Reber et al. | ................... | 360/13 |
| 5,819,103 A | 10/1998 | Endoh et al. | .................. | 395/821 |
| 5,974,004 A * | 10/1999 | Dockes et al. | ................ | 345/727 |
| 6,016,476 A * | 1/2000 | Maes et al. | ...................... | 705/1 |
| 6,047,292 A * | 4/2000 | Kelly et al. | ................... | 345/716 |
| 6,212,527 B1 * | 4/2001 | Gustman | ............................ | 707/1 |
| 6,222,838 B1 * | 4/2001 | Sparks et al. | ................. | 370/352 |
| 6,226,672 B1 * | 5/2001 | DeMartin et al. | .......... | 369/30.08 |
| 6,305,603 B1 * | 10/2001 | Grunbok et al. | ............... | 235/379 |
| 6,332,082 B1 * | 12/2001 | Fuller et al. | ..................... | 455/461 |
| 6,396,919 B1 * | 5/2002 | Shimada et al. | ......... | 379/265.12 |
| 6,430,270 B1 * | 8/2002 | Cannon et al. | .............. | 379/88.19 |
| 6,466,258 B1 * | 10/2002 | Mogenis et al. | ............... | 348/143 |
| 2002/0006126 A1 * | 1/2002 | Johnson et al. | ................ | 370/356 |

FOREIGN PATENT DOCUMENTS

ZA 9803353 A * 1/1999

* cited by examiner

Primary Examiner — Doug Hutton, Jr.
Assistant Examiner — Andrew Dyer
(74) Attorney, Agent, or Firm — Harness, Dickey, Pierce

(57) ABSTRACT

An audio file is linked to a record in a database. The record is accessed and the audio file related to the record is obtained. Once the audio file is obtained, it is recorded on a recording media. The audio file is then linked to the record. In one embodiment of the invention, linking the audio file to the record is accomplished by storing a pointer to the location of the audio file on the recording media in a field of the record. In another embodiment of the invention, the audio file is digitized and the digitized audio file is stored in a memory. The digitized audio file is stored in one of two ways: either in a field of the record, or separately from the record. In the latter case, a pointer to the audio file is stored in a field of the record. Linking the audio file to its related record allows quick and easy access to the audio file from the record. This is particularly useful for client databases since the linking allows quick and easy access to conversations with a client about the client's accounts and/or transactions.

19 Claims, 2 Drawing Sheets

DATABASE WITH LINKED AUDIO FILE

BACKGROUND OF THE INVENTION

1. Field of the Invention

The present invention relates generally to the field of audio files and more particularly to linking an audio file.

2. Description of the Related Art

Many organizations have started recording conversations with clients regarding the clients' account(s) with the organization. For example, financial institutions that transact large sums of money, such as brokerage houses and banks, typically record conversations with clients. Recording a conversation with a client is especially useful when the client requests that a transaction be performed.

The organizations index and archive the recorded conversations, in a continuous fashion by date and time. A problem with such an indexing and archival system is that in case of a dispute, typically, the organization does not know the exact date and/or time when the conversation took place. Therefore, to find the conversation in the archives, the organization must allocate an employee to search through the recorded conversations. This search is an extremely time consuming and expensive task.

SUMMARY OF THE INVENTION

The present invention solves the above-described problems by linking an audio file to a record in a database. The record is accessed and the audio file related to the record is obtained. Once the audio file is obtained, it is recorded on a recording media. The audio file is then linked to the record. In one embodiment of the invention, linking the audio file to the record is accomplished by storing a pointer to the location of the audio file on the recording media in a field of the record. In another embodiment of the invention, the audio file is digitized, and the digitized audio file is stored in a memory. The digitized audio file is stored in one of two ways: either in a field of the record, or separately from the record. In the latter case, a pointer to the audio file is stored in a field of the record.

Linking the audio file to its related record allows quick and easy access to the audio file from the record. This is particularly useful for client databases since the linking allows quick and easy access to conversations with a client about the client's accounts and/or transactions.

DETAILED DESCRIPTION

Figure 1:
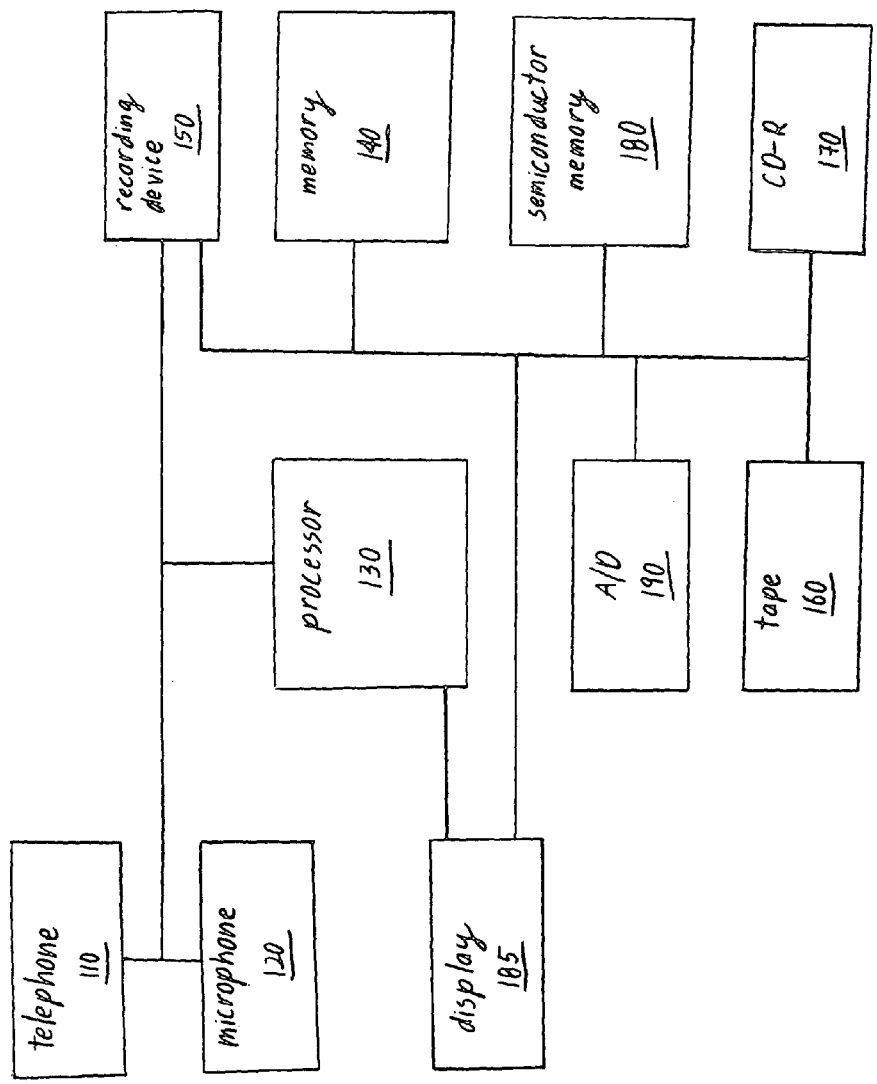
FIG. 1 is a block diagram of a system that links an audio file to a database.

FIG. 1 is a block diagram illustrating system 100. System 100 can be a computer system, or any system or device capable of receiving audio data, storing audio data on a recording media, and linking the audio data to a record of a database.

At least some of the audio data may represent audibly displayable information, for example, audible sound. The audio data may be grouped into an audio file, which can be a set of data or a collection of sets of data. A set of data may be a collection of data with a common characteristic, such as a common time or a time period of reception or creation.

System 100 has processor 130, memory 140, recording device 150, tape 160, recordable compact disc (CD-R) 170, semiconductor memory 180, one or more input devices, such as telephone 110 and microphone 120, and display 185. Display 185 can be any audio, audio-visual, or multimedia display, such as a speaker, or a computer. System 100 may also include other elements, not shown, such as a keyboard, a co-processor, and/or connections to a communications network, such as a local area network (LAN), a wide area network (WAN), or the Internet.

A database is stored in memory 140. In the preferred embodiment, the database is an organization's client database comprising records, each of which is related to one or more client accounts, although the database can be any database comprising records. For example, the organization can be a bank and the database is the bank's client database, with each record in the database storing information about a particular client's account(s).

Figure 2:
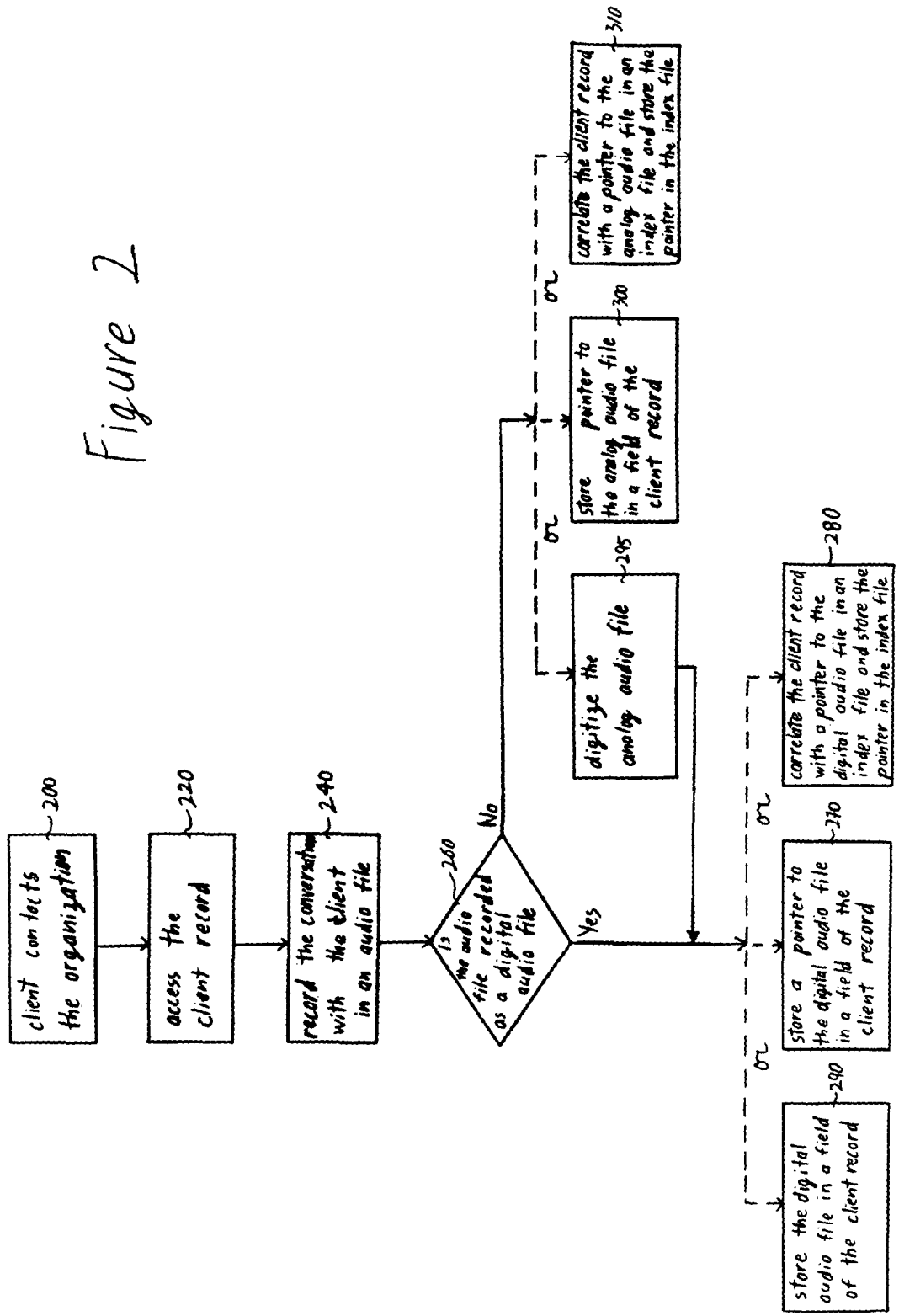
FIG. 2 is a flowchart illustrating the method of linking the audio file to the database.

Referring to FIGS. 1 and 2 concurrently, the operation of system 100 is now explained.

In step 200, clients contact the organization to perform transactions related to their account(s) or to get information about their account(s). A client can contact the organization in person or remotely, for example by calling the organization on telephone 110. If the client contacts the organization in person, the conversation regarding the clients account can be recorded using microphone 120. For ease of reference, the operation of the preferred embodiment will be described for a client contacting the organization by telephone 110, although one skilled in the art will see that the process works similarly for any input device that can receive audio data.

When a client contacts the organization, telephone 110 receives a call and sends a signal to processor 130 that it received a call. In step 220, processor 130 accesses the record related to the client (referred to herein as a client record). Typically, this is accomplished by obtaining information from the client and using the information to locate the client record. The information can be any identifier that makes the client recognizable to the system. For example, the identifier can be the client's personal identification number (PIN), or the clients account number, or combination of identifiers. Obtaining information from the client can be accomplished in any known manner. For example, an operator asks the client for information, or system 100 plays a recorded message that asks the client to enter the information either verbally or through the keypad on the client's telephone.

After the client enters the information processor 130 uses the information to locate the client record, the client record's location in memory 140 is made available to processor 130 and/or the client record is retrieved from memory 140. When the client records' location is made available to the processor, the processor can change the data in the client record. When the client record is retrieved, the information represented by the some of record's fields can be played on display 185.

At about the same time as telephone 110 signals processor 130 that a call is received, either telephone 110 or processor 130 signals recording device 150 to turn on. Recording device 150 can be turned on before processor 130 accesses the client record, after processor 130 accesses the client record, or concurrently with processor 130 accessing the client record.

Alternatively, instead of turning on recording device 150 automatically for every call, processor 130 is programmed to selectively turn on recording device 150. For example, processor 130 can turn on recording device 150 only when the conversation concerns particular client records, or particular accounts, or when the conversation involves an amount of money greater than a predefined minimum amount of money.

In another alternative, an operator selectively turns on recording device 150 at the operator's discretion.

Once recording device 150 is turned on, in step 240, recording device 150 records the conversation with the client in an audio file. Recording device 150 can be any recording device capable of recording the audio file and storing it on a recording media. The audio file can be recorded as an analog file and stored onto an analog recording media, such as a tape; or the audio file can be recorded as a digital file and stored onto a digital recording media, such as a CD-R. Preferably, in the case where the audio file is stored as digital file, the recording device places the time the file was recorded into the audio file's header. The time of recording can be useful later when retrieving the audio file.

System 100 then links the audio file to the client record. Several ways of linking the audio file and the client record are now described for illustrative purposes.

In step 260, the system determines whether the audio file is recorded as an analog or a digital file. In the case where recording device 150 records the audio file as a digital audio file, the audio file can remain in the memory where it was originally recorded, or it can be moved to any other memory in system 100. For example, the audio file can be moved to memory 140 which stores the database, or to semiconductor memory 180. The system generates a pointer, which is a set of data that represents a location in memory where the audio file is stored. In step 270, the pointer is then stored in a field of the client record. A set of data representing a time at which the audio file was recorded can be associated with the pointer and stored with the pointer.

System 100 can also contain an index file that correlates audio files to client records. The index file can be stored in any of the memories in system 100, such as memory 140, which also stores the database, semiconductor memory 180, CD-R 170, or even tape 160. In step 280, the index file correlates the pointer to the client record and stores the pointer. For example, the index file can comprise records, each having at least two fields one of which stores a client record identifier and another field stores the pointer to the location in memory where the audio file is stored.

The system can use the field of the client record or/and the index file to store the location in memory where the audio file is stored.

Alternatively, instead of generating a pointer, in step 290, the system stores the entire audio file as a field of the client record.

In the case where recording device 150 records the audio file as an analog audio file, the audio file can remain in the memory where it was originally recorded, i.e. in the analog recording media such as tape 160. Alternatively, in step 295, the audio file can be digitized and then moved.

When the audio file remains on tape 160, processor 130 generates a pointer to the audio file. The pointer is a set of data that represents the location of the audio file on the tape. For example, the pointer can represent a distance from the start of the tape to the start of the audio file. In step 300, the pointer is then stored either in a field of the client record; or in step 310 the pointer is stored an index file correlating the pointer to the client record.

Returning to step 295, when the audio file is digitized, the audio file is retrieved from the tape and digitized by analog to digital converter (A/D) 190. Although A/D 190 is shown as a discrete element, A/D 190 can be part of processor 130. After, the audio file is digitized, the digitized audio file is then stored. The digitized audio file is stored either as a field in the client record, in step 290, or it is stored as a separate file in any memory of system 100, such as memory 140, semiconductor memory 180, or CD-R 170. In the case where the audio file is stored as a separate file, the system generates a pointer to the audio file and, as described above, either stores the pointer in a field of the client record, in step 270, or in an index file correlating the pointer to the client record, in step 280.

To retrieve the audio file when the pointer is in the field of the client record, processor 130 accesses the client record in the database and then accesses the field in the client record that has the pointer to the audio file. As described above, the time representing when the audio file was recorded can be associated with the pointer. Additionally, processor 130 may have information related to the time the audio file was recorded. If the recording time is associated with the pointer and available to the processor, processor 130 can use this time to assist in locating the correct field. The time the audio file was recorded can be very useful in locating the correct field. For example, there can be several pointers, each pointing to different audio file.

After processor 130 obtains the pointer, it finds the location on the recording media as directed by the pointer and retrieves the audio file. Processor 130 can then send the audio file to display 185 for the information represented by the data in the audio file to be played.

To retrieve the audio file when the pointer is in the index file, processor 130 accesses the index file and locates the pointer correlated to the desired client record, and to the desired time if there is a time associated with the pointer. Processor 130 then finds the location on the recording media directed by the pointer. After processor 130 locates the correct address in the correct memory, it retrieves the audio file. Processor 130 can then send the audio file to display 185 for the information represented by the data in the audio file to be played.

To retrieve the audio file when the audio file is stored in the field of the client record, processor 130 accesses the client record in the database, and then accesses the field in the client record that has the audio file. As described above, the time representing when the audio file was recorded could have been stored in a header of the audio file. Additionally, processor 130 may have information related to the time the audio file was recorded. If the recording time is stored in the header of the audio file and available to the processor, processor 130 can use this time to assist in locating the correct field. After processor 130 locates the correct field, it retrieves the audio file. Processor 130 can then send the audio file to display 185 for the information represented by the data in the audio file to be played.

While the invention has been described with reference to a preferred embodiment, it will be understood by those skilled in the art having reference to the specification and drawing that various modifications and alternatives are possible therein without departing from the spirit and scope of the invention.

I claim:

1. A database system comprising:
a database containing a plurality of financial accounts; and
a processor configured to identify an audio file which is linked to a corresponding financial account in the data base, the audio file being stored on a recording media, the financial account being accessible using a client identifier provided by a client during a communication with the client through a communication link, the audio file containing an audio interaction with the client that is recorded as a result of accessing the financial account through the communication link and a certain criterion being met, wherein the certain criterion is based on an amount of money associated with the financial account exceeding a selected amount.

2. The system according to claim 1, wherein the database further contains,
a pointer associated with the audio file and identifying a location on the recording media where the associated audio file is stored, the pointer stored within the financial account of the client associated with the audio file.

3. An audio recording method comprising:
requesting a client to provide a client identifier during a communication with the client through a communication link, the client identifier corresponding to a financial account in a database;
obtaining the client identifier from the client;
accessing the financial account in the database using the client identifier;
interacting with the client in the communication through the communication link;
recording, as a result of accessing the financial account through the communication link and a certain criterion being met, an audio interaction with the client in the communication in an audio file, wherein the certain criterion is based on an amount of money associated with the financial account exceeding a selected amount;
storing the audio file on a recording media; and
associating the audio file with the financial account.

4. The method according to claim 3, wherein the associating includes storing a pointer to the audio file in a field of the financial account.

5. The method according to claim 3, wherein
the storing step includes storing the audio file in an analog format on an analog recording media; and
the associating step includes,
digitizing the audio file;
storing the digitized audio file in a digital recording media; and
storing a pointer to the digitized audio file in a field of the financial account.

6. The method according to claim 3, wherein
the storing step includes storing the audio file in an analog format on an analog recording media; and
the associating step includes,
digitizing the audio file; and
storing the digitized audio file in a field of the financial account.

7. The method according to claim 3, wherein the storing step includes storing the audio file on a tape.

8. The method according to claim 3, wherein the storing step includes storing the audio file on a CD-R.

9. The method according to claim 3, wherein the storing step includes storing the audio file on a semiconductor memory.

10. The method according to claim 3, further comprising:
accessing a field in the financial account, the field having a pointer to the audio file, wherein the pointer identifies a location where the audio file is stored on the recording media; and
accessing the location on the recording media identified by the pointer.

11. The method according to claim 10, wherein the audio file is a digital audio file.

12. The method according to claim 10, wherein the recording media is a tape.

13. The method according to claim 10, wherein the recording media is a CD-R.

14. The method according to claim 10, wherein the recording media is a semiconductor memory.

15. The method according to claim 3, wherein,
the communication includes a telephone call; and
the recording step includes recording at least a portion of a conversation that takes place over the telephone call.

16. The method according to claim 3, wherein the communication comprises a telephone call initiated by a client.

17. An audio recording method comprising:
requesting a client to provide a client identifier during a communication with the client through a communication link, the client identifier (i) corresponding to a financial account in a database and (ii) identifying one of a plurality of clients;
obtaining the client identifier from the client;
accessing the financial account in the database using the client identifier, the financial account containing information relating to an account of the identified client;
interacting with the client in the communication through the communication link;
recording, as a result of accessing the financial account through the communication link and a certain criterion being met, an audio interaction with the client in the communication in an audio file, wherein the certain criterion is based on an amount of money associated with the financial account exceeding a selected amount;
storing the audio file on a recording media having stored thereon one or more audio files relating to additional clients; and
associating the audio file with the financial account.

18. The method according to claim 17, further comprising:
storing the date on which the audio file was recorded as part of the audio file.

19. The method according to claim 17, further comprising:
storing a pointer associated with the audio file within the financial account, the pointer identifying a location on the recording media where the associated audio file is stored.

* * * * *